(12) United States Patent
Chang

(10) Patent No.: US 7,020,821 B2
(45) Date of Patent: Mar. 28, 2006

(54) REDUNDANT PACKET TELECOMMUNICATION NETWORK SYSTEM USING MINIMUM HAMMING DISTANCES TO CONSTRUCT A FINAL ESTIMATE OF A ORIGINAL CODEWORD

(75) Inventor: Shih-Jeh Chang, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 810 days.

(21) Appl. No.: 09/791,201

(22) Filed: Feb. 22, 2001

(65) Prior Publication Data

US 2002/0161851 A1 Oct. 31, 2002

(51) Int. Cl.
*G06F 11/00* (2006.01)
(52) U.S. Cl. ...................... 714/746; 714/761
(58) Field of Classification Search .............. 714/52, 714/746, 761
See application file for complete search history.

(56) References Cited

U.S. PATENT DOCUMENTS

| 4,447,903 A | * | 5/1984 | Sewerinson ................. 714/821 |
| 5,394,407 A | * | 2/1995 | Coddington ................. 714/752 |
| 6,052,812 A | * | 4/2000 | Chen et al. .................. 714/751 |

* cited by examiner

*Primary Examiner*—Le Hien Luu

(57) ABSTRACT

A method of forward error control in which a transmitter receives data from an input device and creates one or more original codewords that are transmitted onto each of two physically distinct telecommunications channels. Two copies of the original codeword are transmitted to the receiver via physically distinct channels to increase the robustness of the telecommunications channel between the transmitter and the receiver and to minimize the elapsed time between when the transmitter transmits the original codeword and when receiver has a final estimate of the original codeword available for output.

17 Claims, 4 Drawing Sheets

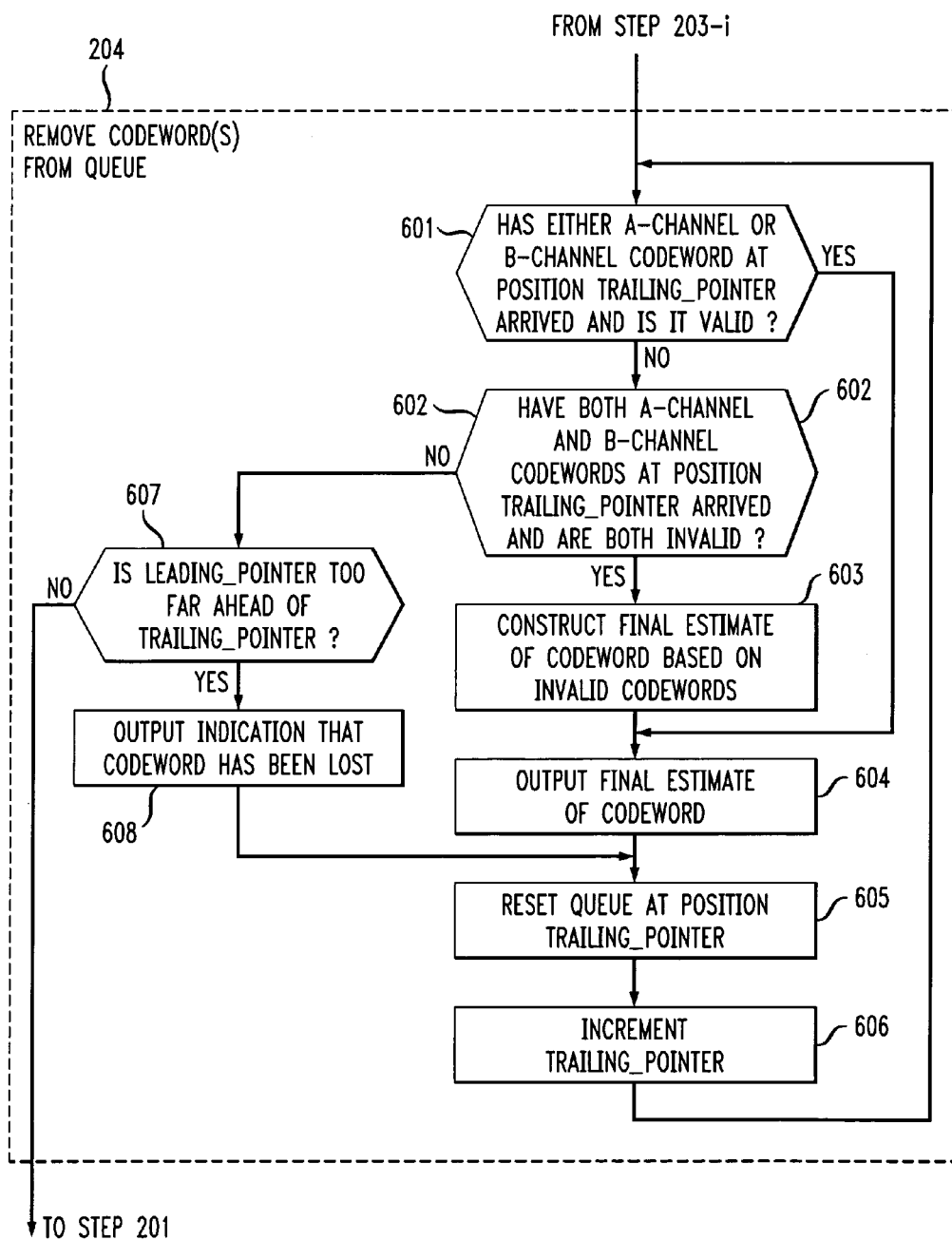

REDUNDANT PACKET TELECOMMUNICATION NETWORK SYSTEM USING MINIMUM HAMMING DISTANCES TO CONSTRUCT A FINAL ESTIMATE OF A ORIGINAL CODEWORD

CROSS-REFERENCE TO RELATED APPLICATIONS

This application is related to U.S. Publication No. 2002/0162071, now abandoned, filed Feb. 22, 2001 and entitled "Forward-Error Control of Redundantly-Transmitted Codewords" (Attorney Docket S.J. Chang 12), which application is incorporated by reference.

FIELD OF THE INVENTION

The present invention relates to telecommunications in general, and, more particularly, to forward error control in packet networks.

BACKGROUND OF THE INVENTION

The problem of dealing with transmission errors in telecommunications networks has been studied for many years. In general, the solutions for dealing with transmission errors fall into two classes: (i) forward error control, and (ii) automatic-repeat-request.

In accordance with forward error control, data is encoded in accordance with an error-control coding scheme that increases the likelihood that the receiver can detect and correct any errors that might occur during transmission.

In accordance with automatic-repeat-request, data is encoded in accordance with an error-control coding scheme that that enables the receiver to detect, but not correct, errors that occur during transmission. In accordance with automatic-repeat-request, when an error is detected, the receiver transmits a message back to the transmitter requesting that the data be re-transmitted. This cycle continues until the receiver believes that the data has been received without error.

Both forward error control and automatic-repeat-request have advantages and disadvantages. The advantage of forward error control is that it avoids the temporal delay associated with automatic-repeat-request. The advantage of automatic-repeat-request is that its error-control coding schemes typically require a lower data bit-to-parity bit ratio (ie., less redundancy), and, therefore, less bandwidth in the communications channels.

There exist applications, however, where the prior art techniques of forward error control and automatic-repeat-request are unsatisfactory. One of these applications is Internet telephony, which is also known as Voice over Internet Protocol ("VoIP"). In Internet telephony, the temporal delay associated with automatic-repeat-request causes unsatisfactory interruptions in the preferably continuous flow of speech. Although this problem can generally be avoided by using error-correction coding schemes, error-correction schemes are ineffective when packets containing voice data are lost or delayed during transmission.

Therefore, the need exists for an improved technique for dealing with transmission errors in telecommunications networks that is particularly advantageous for Internet telephony applications.

SUMMARY OF THE INVENTION

Some embodiments of the present invention deal with transmission errors in telecommunications networks without some costs and disadvantages associated with techniques in the prior art. In particular, the illustrative embodiment of the present invention incorporates a forward error control mechanism that deals with lost, delayed, and corrupted packets.

In accordance with the illustrative embodiment of the present invention, a transmitter receives data from an input device and from it creates one or more original codewords. For example, the transmitter can receive audio data from a microphone and can convert that audio data into one or more original codewords.

The transmitter then transmits a copy of the original codeword onto each of two wireline point-to-point telecommunications channels for delivery to the intended receiver. Advantageously, the two telecommunications channels are both logically and physically distinct. The reason that two copies of the original codeword are transmitted to the receiver via physically distinct channels is to increase the robustness of the overall effective telecommunications channel between the transmitter and the receiver, and to minimize the elapsed time between when the transmitter transmits the original codeword and when receiver has a final estimate of the original codeword available for output.

The illustrative embodiment comprises: transmitting a first copy of an original codeword from a transmitter to a receiver via a first point-to-point telecommunications channel; transmitting a second copy of the original codeword from the transmitter to the receiver via a second point-to-point telecommunications channel; receiving at the receiver a first estimate of the original codeword from the first point-to-point telecommunications channel; and constructing a final estimate of the original codeword based on the first estimate of the original codeword.

BRIEF DESCRIPTION OF THE DRAWINGS

FIG. 6 depicts a flowchart of the detail of step 204, as depicted in FIG. 2.

DETAILED DESCRIPTION

Figure 1:
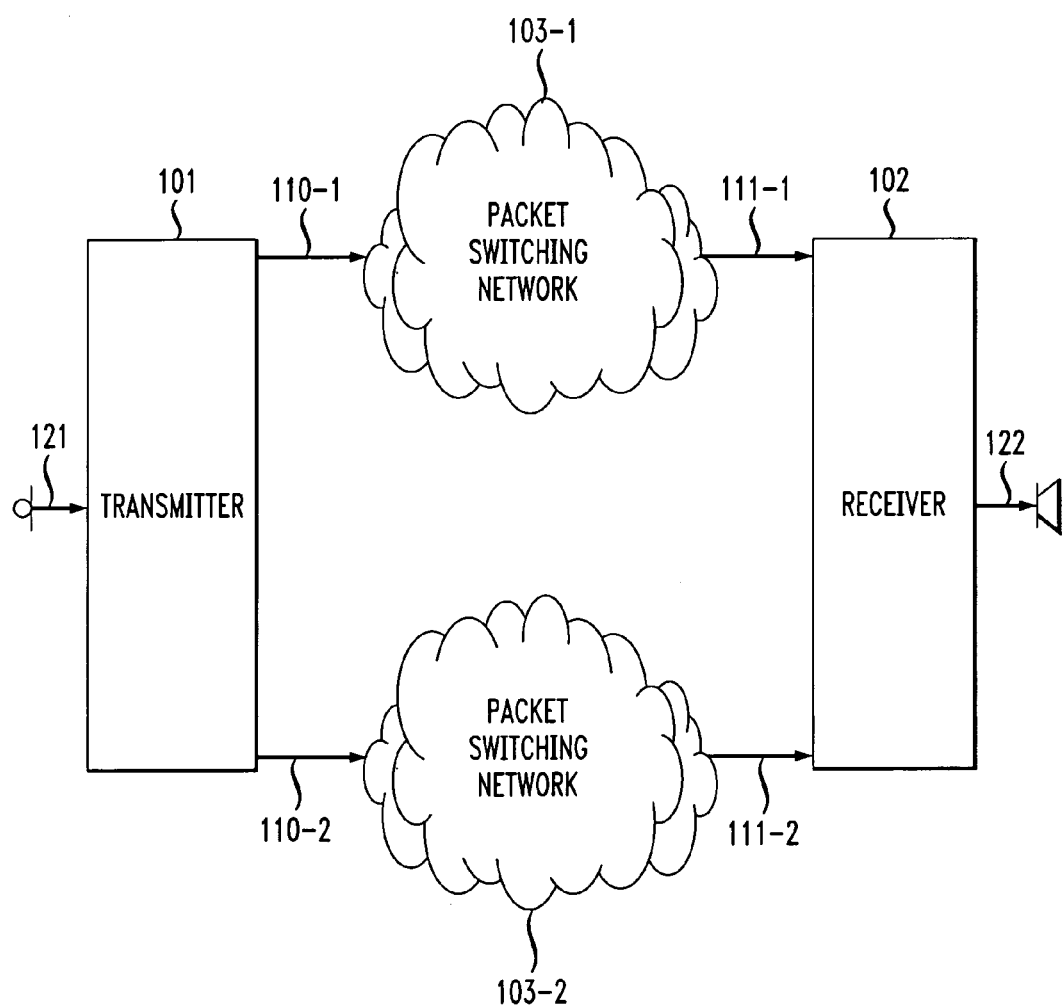
FIG. 1 depicts a schematic diagram of a redundant packet network in accordance with the illustrative embodiment of the present invention.

FIG. 1 depicts a schematic diagram of redundant packet network 100 in accordance with the illustrative embodiment of the present invention. Redundant packet network 100 comprises: transmitter 101 and receiver 102 connected by two logically and physically distinct point-to-point telecommunications channels. The first point-to-point telecommunications channel (hereinafter also called the "A-channel") comprises: physical telecommunications path 110-1, packet switching network 103-1, and physical telecommunications path 111-1. The second point-to-point telecommunications channel (hereinafter also called the "B-channel") comprises: physical telecommunications path 110-2, packet switching network 103-2, and physical telecommunications path 111-2. The input to transmitter 101 is microphone 121, and the output from receiver 102 is speaker 122.

In accordance with the illustrative embodiment of the present invention, each of the first point-to-point telecommunications channel and the second point-to-point telecommunications channel is a "point-to-point" telecommunications channel. For the purposes of this specification, a "point-to-point telecommunications channel" is defined as a conduit for carrying a signal from one entity (e.g., a transmitter, etc.) to another entity (e.g., a receiver, etc.) for which it is intended. Typically, the signals in a point-to-point telecommunications channel are explicitly associated with the address of the entity for which the signals are intended (e.g., an Internet Protocol packet's destination address, etc.). Furthermore, the signals in a point-to-point telecommunications channel are often explicitly associated with an indication of the point-to-point telecommunications channel in which they are carried (e.g., asynchronous transfer mode's virtual path identifier and virtual circuit identifier, etc.).

It will be understood by those skilled in the art that a point-to-point telecommunications channel is not a point-to-multipoint (i.e., broadcast) telecommunications channel, which is a logical conduit for carrying a signal from one entity (e.g., a transmitter, etc.) to a plurality of entities (e.g., a receiver, etc.). Typically, the signals in a point-to-multipoint telecommunications channel are not explicitly associated with the address of the entity for which the signals are intended. Furthermore, the signals in a point-to-multipoint telecommunications channel are generally not explicitly associated with an indication of the point-to-multipoint telecommunications channel in which they are carried.

In accordance with the illustrative embodiment of the present invention, each point-to-point telecommunication channel comprises a series of wireline (e.g. copper, optical fiber, etc.) telecommunications links.

Figure 2:
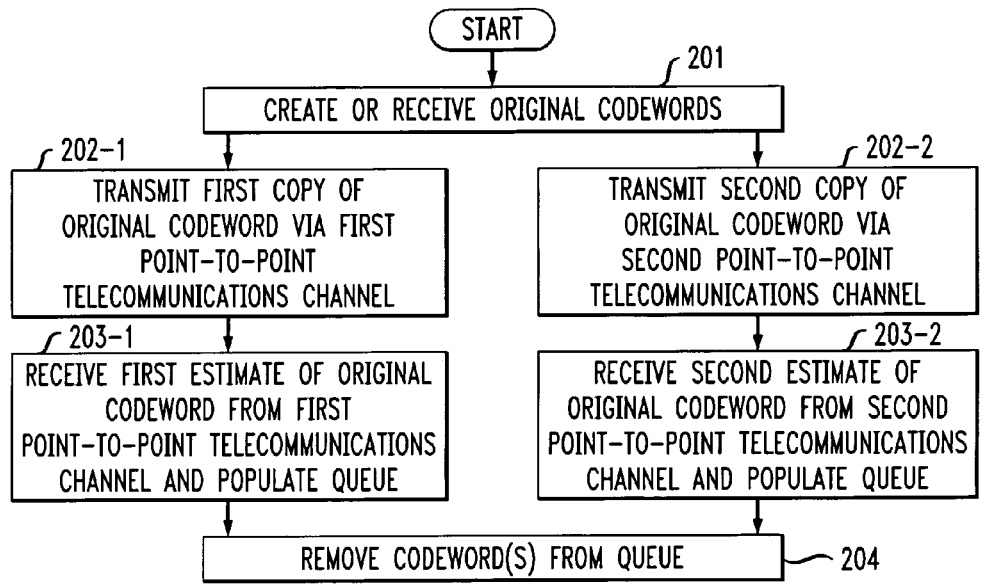
FIG. 2 depicts a flowchart that describes the operation and interaction of the elements depicted in FIG. 1 in accordance with the illustrative embodiment of the present invention.

FIG. 2 depicts a flowchart that describes the operation and interaction of the elements depicted in FIG. 1 in accordance with the illustrative embodiment of the present invention.

At step 201, transmitter 101 receives data from an input device in well-known fashion and from it creates one or more original codewords. To do this, transmitter 101 creates one or more message blocks, each of which comprises k arbitrary message bits, $m_0, m_1, \ldots, m_{k-1}$, based on the input data. For example, transmitter 101 can receive audio data from microphone 121 and can convert that audio data into one or more message blocks.

Each message block is then applied to an error-control coding scheme, in well-known fashion, to produce an n-bit codeword (wherein n>m) that is a valid codeword within the context of that error-control coding scheme. For the purposes of this specification, an "error-control coding scheme" is defined as a system for enabling the detection or correction of the corruption of one or more symbols in a codeword. As is well-known to those skilled in the art, the n−m bits in the n-bit codeword represent redundancy that enable valid codewords in an error-control coding scheme to be distinguished from invalid codewords.

Advantageously, embodiments of the present invention use block error-control coding schemes (e.g., Hamming codes, cyclic codes, Bose-Chaudhuri-Hocquenghem codes, Reed-Solomon Codes, etc.) in contrast to convolutional error-control coding schemes (e.g., trellis coding, etc.) for reasons that will be clear to those skilled in the art after reading this specification. The illustrative embodiment of the present invention uses a simple block error-control coding scheme to facilitate an understanding of the present invention, The error-control coding scheme in accordance with the illustrative embodiment of the present invention comprises a 3-bit codeword, which itself comprises 2 message bits and 1 parity bit. Table 1 depicts the format of a codeword in accordance with the illustrative embodiment. In particular:

TABLE 1

Codeword Format

| $c_0$ | $c_1$ | $c_2$ |
|---|---|---|

Codeword bit $c_0$ equals message bit $m_0$, codeword bit $c_1$ equals message bit $m_1$, and codeword bit $c_2$ is a parity bit that is chosen to force the modulo 2 sum of $c_0$, $c_1$, and $c_2$ to be an even number (i.e., even parity). As will be clear to those skilled in the art, this error-control coding scheme enables only single-bit error detection. Table 2 depicts a list of all eight (i.e., $2^3$) codewords in accordance with the illustrative embodiment.

TABLE 2

List of All Codewords

| $c_0$ | $c_1$ | $c_2$ | Valid Codeword in Scheme? | Message Block |
|---|---|---|---|---|
| 0 | 0 | 0 | Yes | $m_0 = 0, m_1 = 0$ |
| 0 | 0 | 1 | No | — |
| 0 | 1 | 0 | No | — |
| 0 | 1 | 1 | Yes | $m_0 = 0, m_1 = 1$ |
| 1 | 0 | 0 | No | — |
| 1 | 0 | 1 | Yes | $m_0 = 1, m_1 = 0$ |
| 1 | 1 | 0 | Yes | $m_0 = 1, m_1 = 1$ |
| 1 | 1 | 1 | No | — |

In some alternative embodiments of the present invention, transmitter 101 receives one or more codewords from another apparatus, which is not depicted in FIG. 1.

In accordance with the illustrative embodiment, each codeword is associated with a serial number, herein called codeword_serial_number, that assists receiver 102 in:

1. reassembling the received codewords in the proper order, and 2. distinguishing between codewords.

Advantageously, the codeword_serial_number is an n-bit number between 0 and $2^n-1$. Furthermore, serial numbers are assigned to original codewords successively from 0 to infinite, mod $2^n$. Advantageously, n is based on the maximum tolerable latency, L, for a codeword to travel from transmitter 101 to receiver 102, and on the bandwidth, C, as measured in codewords per second, of each point-to-point telecommunications channel between transmitter 101 and receiver 102. In particular:

$$n \geq \lfloor \log_2 2LC \rfloor + 1 \qquad \text{(Eq. 1)}$$

At step 202-1, transmitter 101 transmits a first copy of the original codeword and its accompanying codeword_serial_number, via a first output port, onto the first point-to-point telecommunications channel, via physical telecommunications channel 110-1, for delivery to receiver 102 via packet switching network 103-1 and physical telecommunications channel 111-1. Physical telecommunications channel 110-1 can be either dedicated or multiplexed with other traffic. It will be clear to those skilled in the art how to implement step 202-2.

At step 202-2, transmitter 101 transmits a second copy of the original codeword and its accompanying codeword_serial_number, via a first output port, onto the second point-to-point telecommunications channel, via physical telecommunications channel 110-2 for delivery to receiver 102 via packet switching network 103-2 and physical telecommunications channel 111-2. Physical telecommunications channel 110-2 can be either dedicated or multiplexed with other traffic. It will be clear to those skilled in the art how to implement step 203. Advantageously, the transmission of the first copy of the original codeword onto the first point-to-point telecommunications channel is concurrent with the transmission of the second copy of the original codeword onto the second point-to-point telecommunications channel.

In accordance with the illustrative embodiment of the present invention, two copies of the original codeword are transmitted to receiver 102 via different point-to-point telecommunications channels to:
1. increase the robustness of the overall effective telecommunications channel between transmitter 101 and receiver 102, and
2. minimize the elapsed time between when transmitter 101 transmits the original codeword and when receiver 101 has a final estimate of the original codeword available for output.

Although physical telecommunications channel 111-1 and physical telecommunications channel 111-1 are advantageously physically distinct, packet switching network 103-1 and packet switching network 111-1 can be either the one packet switching network or different packet switching networks. When packet switching network 103-1 and packet switching network 111-1 are one packet switching network, it is still advantageous for the first copy of the codeword and the second copy of the codeword to traverse different physical routes from transmitter 101 to receiver 102.

It will be clear to those skilled in the art that step 202-1 might occur before step 202-2, after step 202-2, or concurrently with step 202-2. Advantageously, the transmission of the first copy of the original codeword onto the first point-to-point telecommunications channel is concurrent with the transmission of the second copy of the original codeword onto the second point-to-point telecommunications channel.

At step 203-1, receiver 102 receives, via a first input port, the first copy of the original codeword, or, more precisely, an estimate of the original codeword and its accompanying codeword_serial_number from the first point-to-point telecommunications channel. It is more accurate to consider what receiver 102 receives to be an estimate of the original codeword rather than a correct facsimile of the codeword because one or more bits in the codeword might have been corrupted in transit.

At step 203-2, receiver 102 receives, via a second input port, the second copy of the original codeword, or, more precisely, an estimate of the original codeword and its accompanying codeword_serial_number from the second point-to-point telecommunications channel. Advantageously, the reception of the first copy of the original codeword from the first point-to-point telecommunications channel is concurrent with the reception of the second copy of the original codeword from the second point-to-point telecommunications channel. It will be clear to those skilled in the art that step 203-1 might occur before step 203-2, after step 203-2, or concurrently with step 203-2. Furthermore, the reception of the reception of the second copy of the original codeword occurs without a request from the receiver for the transmission of the second copy of the original codeword.

Figure 3:
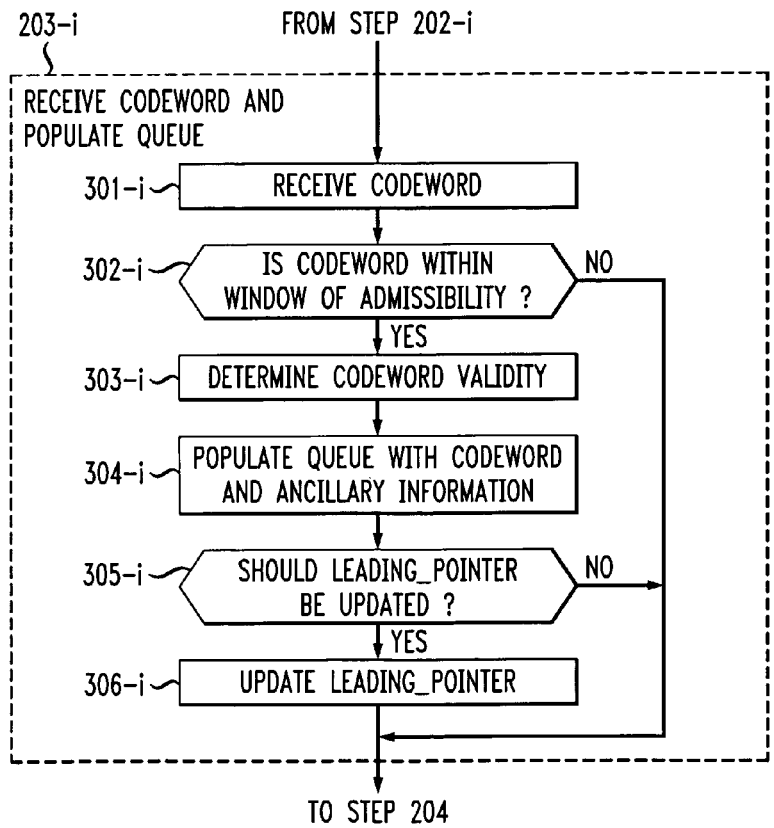
FIG. 3 depicts a flowchart of the detail of step 203-1, as depicted in FIG. 2.

Step 203-1 is described in detail with respect to FIG. 3, and step 203-2 is analogous to step 203-1.

At step 301-1, as indicated above, receiver 102 receives an estimate of the original codeword and its accompanying codeword_serial_number from physical telecommunications channel 111-1 (i.e., the A-channel). Although the estimate of the original codeword can be corrupted in transit, in accordance with the illustrative embodiment of the present invention, the codeword_serial_number accompanying the estimate of the original codeword cannot. It will be clear to those skilled in the art how to make and use embodiments of the present invention in which errors in the codeword_serial_number are corrected with an error-control coding scheme.

At step 302-2, receiver 102 begins the process of determining whether the received codeword should be processed for output to speaker 122. The first step in the process involves determining whether the received estimate of the original codeword should be queued for processing. Table 3 depicts a portion of an illustrative queue in accordance with the illustrative embodiment.

TABLE 3

Queue in Receiver 102 for Holding Received Codewords Pending Construction of Final Estimate of Original Codeword
($N = 2'' - 1$; trailing_pointer = 2; leading_pointer = j + 1)

| Codeword Serial Number | A-Channel | | | B-Channel | | |
|---|---|---|---|---|---|---|
| | Received? | Valid? | Codeword | Received? | Valid? | Codeword |
| 0 | No | N/A | N/A | No | N/A | N/A |
| 1 | No | N/A | N/A | No | N/A | N/A |
| 2 | Yes | Yes | 001 | Yes | No | 011 |
| ... | ... | ... | ... | ... | ... | ... |
| j | Yes | No | 001 | Yes | No | 001 |
| j + 1 | No | N/A | N/A | Yes | No | 010 |
| j + 2 | No | N/A | N/A | No | N/A | N/A |
| j + 3 | No | N/A | N/A | No | N/A | N/A |
| ... | ... | ... | ... | ... | ... | ... |
| N − 3 | No | N/A | N/A | No | N/A | N/A |
| N − 2 | No | N/A | N/A | No | N/A | N/A |
| N − 1 | No | N/A | N/A | No | N/A | N/A |
| N | No | N/A | N/A | No | N/A | N/A |

Figure 4:
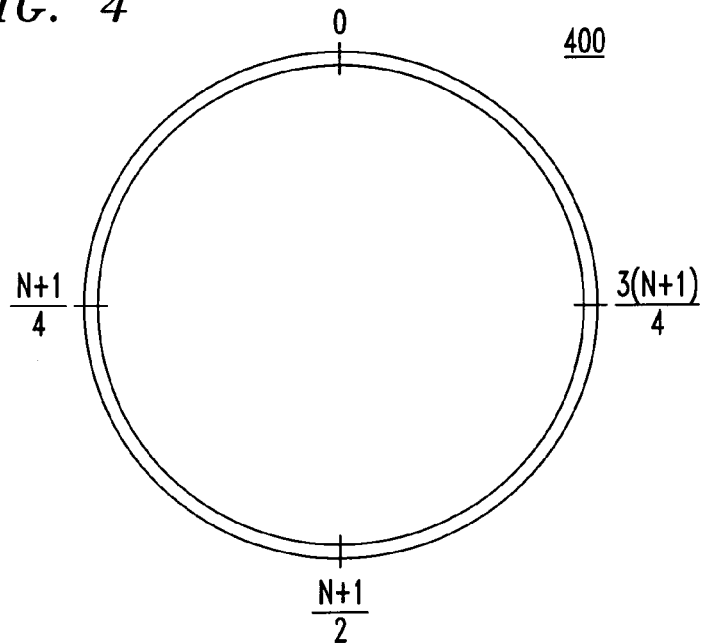
FIG. 4 depicts a circular queue with N records.

The queue advantageously comprises N rows, each of which uniquely corresponds to a codeword_serial_number. The queue advantageously also comprises fields for codewords from both the A-channel and the B-channel, as well as an indication of whether the codeword from that channel has been received and whether it is a valid codeword in the error-control coding scheme. As depicted in FIG. 4, the queue can be conceptualized as a circular queue in which the entry for codeword_serial_number=0 follows that for codeword_serial_number=N.

In accordance with the illustrative embodiment of the present invention, the estimates of the codewords can arrive at receiver 102 out of order from which they were sent. In other words, although a first copy of an original codeword with codeword_serial_number=57 was transmitted via the first point-to-point telecommunications channel before a first copy of an original codeword with codeword_serial_number=58, the estimate of the original codeword with codeword_serial_number=57 might arrive at receiver much later than the estimate of the original codeword with codeword_serial_number=58 and even much later than the estimate of the original codeword with codeword_serial_number=4753.

Figure 5:
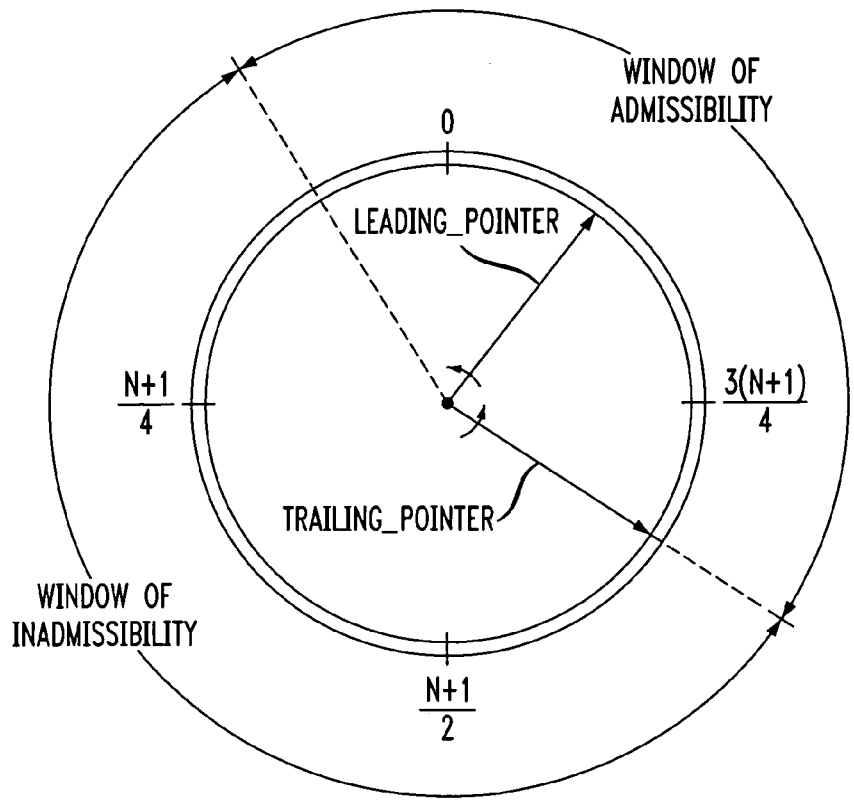
FIG. 5 depicts the circular queue of FIG. 4, the trailing_pointer, the leading_pointer, the window of admissibility, and the window of inadmissibility.

In accordance with the illustrative embodiment of the present invention, receiver 102 waits for a maximum length of time for lost codewords and codewords that arrive after other codewords have arrived that were transmitted earlier. To cull out codewords that arrive too late to be useful, and to ensure that receiver 102 is not thwarted by the loss of a codeword, receiver 102 employs a "window of admissibility" for determining which received codewords are put into the queue and which are discarded. As depicted in FIG. 5, the window of admissibility is defined as a range of codeword_serial_numbers that is bounded on the lower end by an n-bit pointer called the "tralling_pointer" and on the upper end by a value equal to the trailing_pointer plus L, the maximum tolerable latency as used above to determine an appropriate value for N. Therefore, codewords whose codeword_serial_number is within the window of admissibility are stored in the queue, while those whose codeword_serial_number is not, are not. The trailing_pointer is advantageously an n-bit, mod $2^n$, counter with an initial value of 0.

Therefore, at step 302-1, receiver 102 determines whether the codeword received at step 301-1 is within the window of admissibility. If the codeword_serial_number accompanying the codeword is within the window of admissibility, then control passes to step 303-1; otherwise, control passes to step 306-1 and the codeword is discarded. Given the modular nature of the codeword_serial_number (i.e., the fact that codeword_serial_number=0 comes after codeword_serial number=N), the following algebraic expression determine whether the codeword received at step 301-1 is within the window of admissibility:

IF:
[(trailing_pointer+L>trailing_pointer) AND
[(codeword_serial_number<trailing_pointer) OR
(codeword_serial_number>trailing_pointer+L)]]
OR
[(trailing_pointer+L≦trailing_pointer) AND
(codeword_serial$_{13}$ number<trailing_pointer) AND
(codeword_serial_number>trailing_pointer+L)]
THEN:
// Codeword not within window of admissibility //
Go to step 204 and discard codeword;
ELSE:
// Codeword within window of admissibility //
Go to step 303-1 and prepare to store codeword in queue at position codeword_serial_number.

It will be clear to those skilled in the art how to verify the logical expression depicted above for determining whether the codeword received at step 301-1 is within the window of admissibility.

At step 303-1, receiver 102 determines whether the codeword received at step 301-1 is a valid codeword in the error-control coding scheme or not. It will be clear to those skilled in the art how to determine this.

At step 304-1, receiver 102 populates the queue at the location codeword_serial_number, indicates that the codeword has been received, and indicates whether the codeword was a valid codeword in the error-control coding scheme or not, in the appropriate columns. In other words, codewords from the first point-to-point telecommunications channel and ancillary information regarding those codewords go in the fields associated with the A-channel, and codewords from the second point-to-point telecommunications channel and ancillary information regarding those codewords go in the fields associated with the B-channel.

At step 305-1, receiver 102 determines whether the "leading_pointer" should be updated. The leading_pointer is an n-bit, mod $2^n$, counter with an initial value of 0, that indicates the codeword_serial_number of the most recently transmitted codeword within the window of admissibility that has been received by receiver 102. The purpose of the leading pointer is provide a gauge for enabling receiver 102 to determine what kind of latency receiver 102 is actually experiencing. In other words, the difference between the leading_pointer and the trailing pointer is the actual latency, as measured in codewords, that receiver 102 is actually experiencing at any moment. When the codeword_serial_number of the codeword has been determined to be within the window of admissibility, then receiver 102 can determine if the leading_pointer should be updated with the following expression:

IF:
(codeword_serial_number>leading_pointer) OR
(codeword_serial_number<trailing_pointer)
THEN:
// Leading_pointer should be updated //
Go to step 306-1 and update leading_pointer At step 306-1, receiver 102 updates the leading_pointer by setting it equal to the codeword_serial_number. From step 306-1, control passes to step 204, as depicted in FIG. 2.

At step 204, receiver 102 removes one or more codewords from the queue for output. In accordance with the illustrative embodiment of the present invention, step 204 is performed after the reception of each codeword on either the first point-to-point telecommunications channel or the second point-to-point telecommunications channel. After each codeword arrives, receiver 102 must determine whether enough codewords have arrived, in satisfactory condition, to construct the final estimate of one or more original codewords. FIG. 6 depicts the elements of step 204 in detail.

At step 601, receiver 102 determines whether either the A-channel codeword or the B-channel codeword in the queue at the position pointed to by the trailing_pointer has arrived and is it valid? This can be determined by inspecting Table 3. If either the A-channel codeword or the B-channel codeword in the queue at the position pointed to by the trailing_pointer has arrived and is valid, then control passes to step 604; otherwise control passes to step 602.

At step 602, receiver 102 determines if both the A-channel codeword and the B-channel codeword in the queue at the position pointed to by the trailing_pointer have arrived and are both of them invalid. This too can be determined by inspecting Table 3. If both the A-channel codeword and the B-channel codeword in the queue at the position pointed to by the trailing_pointer have arrived and are both invalid, then control passes to step 603; otherwise control passes to step 607.

At step 603, receiver 102 constructs a final estimate of original codeword based on both of the A-channel codeword and the B-channel codeword in the queue at the position pointed to by the trailing_pointer, even though they are both invalid. Advantageously, receiver 102 constructs a final estimate of the original codeword by selecting a valid codeword in the error-control coding scheme such that the Hamming distance between the final estimate of the original codeword and the A-channel estimate of the original codeword plus the Hamming distance between the final estimate of the original codeword and the B-channel estimate of the original codeword is a minimum. This step is taught in detail in U.S. patent application Ser. No. 09/___,___, filed on the same day as this application and entitled "Forward-Error Control of Redundantly-Transmitted Codewords" (Attorney Docket S.J. Chang 12) which application is incorporated by reference. From step 603, control passes to step 604.

At step 604, receiver 102 outputs the final estimate of the original codeword, in well-known fashion. For example, when the original codeword represents audio data, receiver 102 might output the audio data to speaker 122. If control arrives at step 604 from step 603, the final estimate of the original codeword is that constructed in step 603. If control arrives at step 604 from step 601, then the final estimate of the original codeword is either the A-channel codeword or the B-channel codeword in the queue at the position pointed to by the trailing_pointer which has arrived and is valid. From step 604, control passes to step 605.

At step 605, receiver 102 resets or clears the queue at the position pointed to by the trailing_pointer. From step 605, control passes to step 606.

At step 606, receiver 102 increments the trailing_pointer by one. From step 606, control passes back to step 601 to determine if there more enough codewords have arrived, in satisfactory condition, to construct the final estimate of another original codeword.

At step 607, receiver 102 determines if the leading_pointer is too far ahead of the trailing_pointer. In other words, if too much time has elapsed since at least one valid codeword or two invalid codewords with codeword_serial_number=trailing_pointer should have arrived. This can be determined from the following expression:

IF:
leading_pointer>trailing_pointer+L
THEN:
// A codeword has been lost //
Go to step 608 and output that a codeword has been lost.
ELSE:
// Wait awhile to see if more codewords arrive //
Go to step 201.

At step 608, receiver 102 outputs an indication that a codeword with codeword_serial_number=trailing_pointer has been lost. From step 608, control passes to step 605.

It will be clear to those skilled in the art that some embodiments of the present invention are equally applicable to fault recovery as well as to error correction. Furthermore, it will be clear to those skilled in the art that in some alternative embodiments of the present invention that codeword re-sequencing is not necessary. In other words, some alternative embodiments of the present invention need not re-order codewords that arrive out of order.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method comprising:
   generating an original codeword according to an error-control coding scheme;
   associating said original codeword with a codeword serial number;
   transmitting a first copy of said original codeword and said codeword serial number from a transmitter to a receiver via a first point-to-point telecommunications channel;
   transmitting a second copy of said original codeword and said codeword serial number from said transmitter to said receiver via a second point-to-point telecommunications channel;
   receiving at said receiver a first estimate of said original codeword and said codeword serial number from said first point-to-point telecommunications channel;
   receiving at said receiver a second estimate of said original codeword and said codeword serial number from said second point-to-point telecommunications channel; and
   constructing a final estimate of said original codeword by selecting a valid codeword in said error-control coding scheme such that the Hamming distance between the final estimate of the original codeword and said first estimate of the original codeword plus the Hamming distance between the final estimate of the original codeword and the second estimate of the original codeword is a minimum.

2. The method of claim 1 further comprising:
   determining whether said first estimate of said original codeword is within a window of admissibility;
   where said first estimate of said original codeword is within said window of admissibility, determining whether said first estimate of said original codeword is a valid codeword in said error-control coding scheme; and
   populating a queue with said first estimate of the original codeword along with an indication of whether said first estimate of the original codeword is a valid codeword in said error-control coding scheme.

3. The method of claim 2 wherein said
   queue is circular and comprises a plurality of rows, with each of said rows corresponding to a different codeword serial number, and fields for codewords from both of said telecommunications channels.

4. The method of claim 1 wherein said original codeword is a valid codeword in said error-control coding scheme, and wherein said final estimate of said original codeword is based solely on the earlier to arrive of:
   (i) said first estimate of said original codeword, provided that said first estimate of said original codeword is a valid codeword in said error-control coding scheme, and
   (ii) said second estimate of said original codeword, provided that said second estimate of said original codeword is a valid codeword in said error-control coding scheme.

5. A telecommunications network comprising:
   means for generating an original codeword according to an error-control coding scheme and associating said original codeword with a codeword serial number;
   a transmitter for transmitting a first copy of said original codeword and said associated codeword serial number from a transmitter to a receiver via a first point-to-point telecommunications channel, and for transmitting a second copy of said original codeword and said associated codeword serial number from said transmitter to said receiver via a second point-to-point telecommunications channel;
   a receiver for receiving a first estimate of said original codeword and said associated codeword serial number from said first point-to-point telecommunications channel, receiving a second estimate of said original codeword and said associated codeword serial number from said transmitter from said second point-to-point telecommunications channeland constructing a final estimate of said original codeword by selecting a valid codeword in said error-control coding scheme such that the Hamming distance between the final estimate of the original codeword and said first estimate of the original codeword plus the Hamming distance between the final estimate of the original codeword and the second estimate of the original codeword is a minimum; and a queue in said receiver for holding received codewords pending construction of said final estimate of said original codeword.

6. The telecommunications network of claim 5 wherein said queue is circular and comprises a plurality of rows, with each of said rows corresponding to a different codeword serial number, and fields for codewords from both of said telecommunications channels.

7. The telecommunications network of claim 5 wherein said original codeword is a valid codeword in said error-control coding scheme, and wherein said receiver is also for ensuring that said final estimate of said original codeword is a valid codeword in said error-control coding scheme.

8. The telecommunications network of claim 5 wherein said original codeword is a valid codeword in said error-control coding scheme, and wherein said final estimate of said original codeword is based solely on the earlier to arrive of:
  (i) said first estimate of said original codeword, provided that said first estimate of said original codeword is a valid codeword in said error-control coding scheme, and
  (ii) said second estimate of said original codeword, provided that said second estimate of said original codeword is a valid codeword in said error-control coding scheme.

9. A method comprising:
generating an original codeword according to an error-control coding scheme;
associating said original codeword with a codeword serial number;
concurrently transmitting a first copy of said original codeword and said codeword serial number from a transmitter to a receiver via a first point-to-point telecommunications channel and a second copy of said original codeword and said codeword serial number from said transmitter to said receiver via a second point-to-point telecommunications channel;
receiving at said receiver a first estimate of said original codeword and said codeword serial number from said first point-to-point telecommunications channel and a second estimate of said original codeword and said codeword serial number from said second point-to-point telecommunications channel;
determining whether said first estimate of said original codeword is within a window of admissibility;
where said first estimate of said original codeword is within said window of admissibility, determining whether said first estimate of said original codeword is a valid codeword in said error-control coding scheme; and
populating a circular queue with said first estimate of the original codeword along with an indication of whether said first estimate of the original codeword is a valid codeword in said error-control coding scheme; and
constructing a final estimate of said original codeword by selecting a valid codeword in said error-control coding scheme such that the Hamming distance between the final estimate of the original codeword and said first estimate of the original codeword plus the Hamming distance between the final estimate of the original codeword and the second estimate of the original codeword is a minimum.

10. The method of claim 9 wherein said original codeword is a valid codeword in said error-control coding scheme, and further comprising ensuring that said final estimate of said original codeword is a valid codeword in said error-control coding scheme.

11. A transmitter comprising:
a first output port for transmitting a first copy of an original codeword and an associated codeword serial number from a transmitter to a receiver via a first point-to-point telecommunications channel; and
a second output port for transmitting a second copy of said original codeword and said associated codeword serial number from said transmitter to said receiver via a second point-to-point telecommunications channel;
wherein the transmission of said first copy of said original codeword is concurrent with the transmission of said second copy of said original codeword and a final estimate of said original codeword is constructed by selecting a valid codeword in said error-control coding scheme such that the Hamming distance between the final estimate of the original codeword and said first estimate of the original codeword plus the Hamming distance between the final estimate of the original codeword and the second estimate of the original codeword is a minimum.

12. The transmitter of claim 11 wherein said original codeword is a valid codeword in said error-control coding scheme.

13. The transmitter of claim 12, wherein said error-control scheme comprises a block error control coding scheme and said original codeword comprises a three-bit codeword, including two message bits and a parity bit.

14. The transmitter of claim 12 wherein said telecommunications channels are multiplexed with other traffic.

15. A receiver comprising:
a first input port for receiving a first copy of an original codeword from a transmitter via a first point-to-point telecommunications channel; and
a second input port for receiving a second copy of said original codeword from said transmitter via a second point-to-point telecommunications channel; and
a queue in said receiver for holding received codewords pending construction of a final estimate of said original codeword;
wherein the reception of said first copy of said original codeword is concurrent with the reception of said second copy of said original codeword and said final estimate comprises a valid codeword in said error-control coding scheme such that the Hamming distance between the final estimate of the original codeword and said first estimate of the original codeword plus the Hamming distance between the final estimate of the original codeword and the second estimate of the original codeword is a minimum.

16. The receiver of claim 15 wherein said original codeword is a valid codeword in said error-control coding scheme, and further comprising ensuring that said final estimate of said original codeword is a valid codeword in said error-control coding scheme.

17. The receiver of claim 15 wherein said queue is circular and comprises a plurality of rows, each of which corresponds to a codeword serial number, and fields for codewords from both of said telecommunications channels.

* * * * *